United States Patent [19]

Delgado et al.

[11] Patent Number: 5,578,650
[45] Date of Patent: Nov. 26, 1996

[54] METHODS OF PREPARING HOLLOW ACRYLATE POLYMER MICROSPHERES

[75] Inventors: Joaquin Delgado, Stillwater, Minn.; Kengo Imamura, Sagamihara, Japan

[73] Assignee: Minnesota Mining and Manufacturing Company, St. Paul, Minn.

[21] Appl. No.: 566,050

[22] Filed: Dec. 1, 1995

[51] Int. Cl.⁶ .................. C08J 9/28; C08J 9/32
[52] U.S. Cl. .................. 521/56; 521/60; 521/63; 521/64; 521/149; 523/223; 524/801
[58] Field of Search ............... 521/63, 64, 56, 521/149, 60; 523/223; 524/801

[56] References Cited

U.S. PATENT DOCUMENTS

| | | | |
|---|---|---|---|
| 4,968,562 | 11/1990 | Delgado | 521/63 |
| 4,988,567 | 1/1991 | Delgado | 428/402 |
| 4,994,322 | 2/1991 | Delgado et al. | 428/343 |
| 5,045,569 | 9/1991 | Delgado | 521/60 |
| 5,053,436 | 10/1991 | Delgado | 521/64 |
| 5,196,246 | 3/1993 | Kauss et al. | 428/39 |
| 5,266,402 | 11/1993 | Delgado et al. | 428/355 |
| 5,508,313 | 4/1996 | Delgado et al. | 521/63 |

FOREIGN PATENT DOCUMENTS

| | | |
|---|---|---|
| WO/92/13924 | 8/1992 | WIPO . |
| WO/93/12147 | 6/1993 | WIPO . |
| WO/94/13751 | 6/1994 | WIPO . |

*Primary Examiner*—Morton Foelak
*Attorney, Agent, or Firm*—Gary L. Griswold; Walter N. Kirn; Christine T. O'Shaughnessy

[57] ABSTRACT

A one-step emulsification process for preparing aqueous suspensions of hollow, acrylate polymer microspheres conducted in the presence of at least one acid that is not free radically polymerizable. Surprisingly, the use of such an acid eliminates the previous requirement of using a polar copolymerizable monomer in the one-step emulsification process. The hollow acrylate polymer microspheres prepared from the process of the invention may be tacky or tack-free.

17 Claims, No Drawings

METHODS OF PREPARING HOLLOW ACRYLATE POLYMER MICROSPHERES

FIELD OF THE INVENTION

This invention relates to methods of preparing hollow, acrylate polymer microspheres. More specifically, the invention relates to a one-step emulsification process for preparing aqueous suspensions of hollow, acrylate polymer microspheres. The one-step emulsification process is conducted in the presence of at least one acid that is not free radically polymerizable. Surprisingly, the use of such an acid eliminates the previous need for using a polar copolymerizable monomer in a one-step emulsification process. The microspheres prepared from the process of the invention may be tacky or tack-free. Tacky microspheres are especially useful for providing repositionable pressure sensitive adhesives, while tack-free microspheres are especially useful as fillers for such products as sealers, coatings, adhesives and the like.

BACKGROUND OF THE INVENTION

Hollow, acrylate polymer microspheres are known in the art for a variety of applications. They may be tacky or tack-free. Tacky, hollow, acrylate polymer microspheres are especially useful for providing repositionable pressure sensitive adhesives. The term "repositionable" refers to the ability to be repeatedly adhered to and removed from a substrate without substantial loss of adhesion capability. Tack-free hollow acrylate polymer microspheres, on the other hand, are especially useful as fillers for products such as sealers, coatings and adhesives. They can also be useful as dry lubricants, vibration damping materials, and rheology control agents.

U.S. Pat. No. 5,053,436 (Delgado), assigned to the assignee of the present case, describes tacky, hollow microspheres that are useful as repositionable pressure sensitive adhesives. The microspheres comprise at least about 85 parts by weight of at least one alkyl acrylate or methacrylate ester and up to 15 parts by weight of at least one polar monomer. Two methods are described for preparing aqueous suspensions of the tacky, hollow microspheres. The first method employs a "two-step" emulsification process comprising the steps of (1) forming a water-in-oil emulsion of a water phase (comprising water and at least one polar monomer) in oil phase monomer(s) using an emulsifier; and (2) forming a water-in-oil-in-water emulsion by dispersing the water-in-oil emulsion into an aqueous phase comprising an emulsifier. An aqueous suspension of monomer droplets is formed which upon polymerization become microspheres. A majority of the microspheres have at least one interior cavity that upon drying becomes an interior void.

The second method described for preparing the hollow, tacky microspheres employs a "one-step" emulsification process comprising the step of forming droplets by mixing oil phase monomer, moderately ionized polar copolymerizable monomer and an emulsifier. Here again, an aqueous suspension of monomer droplets is formed which upon polymerization become microspheres.

WO 93/12147 (Delgado), also assigned to the assignee of the present case, describes tack-free, hollow, acrylate microspheres that are useful as fillers. This reference also describes "two-step" and "one-step" emulsification processes for preparing aqueous suspensions of microspheres. The "two-step" emulsification process of this reference comprises the steps of (1) forming a water-in-oil emulsion of a water phase (comprising water and optionally at least one polar monomer) in an oil phase (comprising oil phase monomer(s), at least one multifunctional crosslinking agent, and at least one oil-soluble free radical initiator) using an emulsifier and (2) forming a water-in-oil-in-water emulsion by dispersing the water-in-oil emulsion into an aqueous phase comprising an emulsifier.

The "one-step" emulsification process of WO 93/12147 comprises the step of forming droplets by mixing oil phase monomer, at least one polar copolymerizable monomer, at least one multifunctional crosslinking agent, at least one emulsifier, at least one oil-soluble free radical initiator, and an aqueous phase.

Of the two methods described above for preparing tacky and tack-free hollow, acrylate polymer microspheres, the "one-step" emulsification process is preferred. This is because the one-step method is more efficient and cost effective than the two-step method, requiring less steps to produce an emulsion. The "one-step" emulsification process, however, requires the use of a polar copolymerizable monomer. Thus, it would be desirable to provide a "one-step" emulsification process that can be used without polar copolymerizable monomer to provide hollow, acrylate polymer microspheres that are either tacky or tack-free.

SUMMARY OF THE INVENTION

The present invention provides a process for preparing hollow, acrylate polymer microspheres. The process employs a one-step emulsification process which does not require the use of polar copolymerizable monomer. Surprisingly, this is accomplished by using at least one acid that is not free radically polymerizable.

Preferably, the process of the invention comprises the steps of forming an emulsion using a one-step emulsification process followed by polymerization. More specifically, the process preferably comprises the steps of:

(1) forming an emulsion of monomer droplets in an aqueous phase by blending a mixture comprising:
   (i) at least one monomer of an alkyl acrylate or methacrylate ester of a non-tertiary alcohol,
   (ii) at least one acid that is not free radically polymerizable,
   (iii) at least one emulsifier, and
   (iv) water, and (2) initiating polymerization of the monomer droplets.

The mixture may further optionally comprise at least one initiator and at least one multifunctional crosslinking agent. The emulsion is preferably formed by agitating the mixture using, for example, mechanical or ultrasonic means. This produces an aqueous emulsion of monomer droplets which upon polymerization become microspheres, a majority of which have at least one interior cavity that upon drying becomes a void.

Tacky microspheres may be used to provide repositionable pressure sensitive adhesives, while tack-free microspheres may be used as fillers for products such as sealers, coatings, and adhesives. They can also be useful as dry lubricants, vibration damping materials, and theology control agents.

The following terms have these meanings as used herein:
1. The term "droplet" means the liquid stage of the microspheres prior to the completion of polymerization.
2. The term "cavity" means a space completely within the walls of a droplet or microsphere when still in the suspension or dispersion medium prior to drying, and thus containing whatever medium was used.

3. The term "void" means an empty space completely within the walls of a polymerized microsphere.
4. The term "hollow" means containing at least one void or cavity.
5. The term "tack-free" means that the material displays no perceived tack when subjected to a "thumb test" as described by D. Satas in the *Handbook of Pressure Sensitive Adhesive Technology*, 2nd ed., Von Nostrand Reinhold (New York, 1989), page 39.
6. The term "equivalent weight percent" of a given compound means that number of equivalents of that compound divided by the total number of equivalents in the composition, wherein an equivalent is the total number of grams divided by equivalent weight. The equivalent weight means the molecular weight divided by the number of polymerizable groups in the compound and, in the case of those compounds with only one polymerizable group, the equivalent weight equals the molecular weight.

DETAILED DESCRIPTION OF THE INVENTION

Preferably, the process of the invention comprises the steps of forming an emulsion using a one-step emulsification process followed by polymerization. More specifically, the process preferably comprises the steps of:

(1) forming an emulsion of monomer droplets in an aqueous phase by blending a mixture comprising:
   (i) at least one monomer of an alkyl acrylate or methacrylate ester of a non-tertiary alcohol,
   (ii) at least one acid that is not free radically polymerizable,
   (iii) at least one emulsifier, and
   (iv) water, and
(2) initiating polymerization of the monomer droplets.

The mixture of step (1) may further optionally comprise at least one initiator and at least one multifunctional crosslinking agent. Other additives such as pigments, fillers, stabilizers, tackifiers, plasticizers, and the like may also be included. The emulsion is preferably formed by agitating the mixture using, for example, mechanical or ultrasonic means. This produces an emulsion of monomer droplets in an aqueous phase. The monomer droplets themselves comprise a water-in-oil emulsion (i.e., an emulsion of oil phase monomer in an aqueous phase). Thus, the emulsion formed from the one-step emulsification process of the invention may be described as a "water-in-oil-in-water" emulsion.

The polymerization process of the monomer droplets is known in the art as aqueous suspension polymerization. During this process, the droplets become microspheres, a majority of which have at least one interior cavity that upon drying becomes a void. Heat or radiation may be used to initiate polymerization of the monomers. Initiators may optionally be included in the emulsion, examples of which include those which are normally suitable for free radical polymerization of acrylate monomers. Preferred initiators include those which are oil-soluble. Examples of such initiators include thermally-activated initiators such as azo compounds, hydroperoxides, peroxides, and the like, and photoinitiators such as benzophenone, benzoin ethyl ether, and 2,2-dimethoxy-2-phenyl acetophenone. The initiator is generally present in an amount ranging from about 0.01 to about 10 weight percent of the total weight of the polymerizable composition.

A majority of the microspheres formed during aqueous suspension polymerization have at least one interior cavity comprising the emulsion medium. Upon drying, the interior cavity becomes a void. Drying is typically accomplished by exposing the microspheres to temperatures sufficient to drive off the emulsion medium, but lower than the decomposition temperature of the microspheres. Typical drying temperatures are in the range of about 60° C. to about 100° C. with exposure times of about 1 to 10 minutes.

As stated previously, the emulsion comprises at least one monomer of an alkyl acrylate or alkyl methacrylate ester of a non-tertiary alcohol, at least one acid that is not free radically polymerizable, at least one emulsifier, and water. Preferably, the acid is provided in an amount sufficient to give a pH less than 6 in the resulting emulsion as measured using a pH meter. Numerous acids which are not free-radically polymerizable are known in the art. Typically, acids that are not free radically polymerizable do not comprise carbon-carbon double bonds. They may be organic or inorganic. Examples include acetic acid, hexanoic acid, phenyl undecanoic acid, stearic acid, hydrochloric acid, and the like.

The emulsifier is preferably utilized in concentrations greater than its critical micelle concentration. Critical micelle concentration is defined as the minimum concentration of emulsifier necessary for the formation of micelles, i.e., submicroscopic aggregations of emulsifier molecules. Critical micelle concentration is slightly different for each emulsifier, but typically is in the range from about $1.0 \times 10^{-4}$ to about 3 moles/liter. Preferred emulsifiers for the process of the present invention have hydrophilic-lipophilic balance (HLB) values greater than about 15. Emulsifiers with such HLB values will produce stable cavity-containing droplets during polymerization in the presence of an acid which provides a pH of less than 6. Examples of such emulsifiers include alkylarylether sulfates such as sodium alkylarylether sulfate, e.g., Triton™ W/30, available from Rohm and Haas; alkylarylpolyether sulfates such as alkylarylpoly(ethylene oxide) sulfates; alkyl sulfates such as sodium lauryl sulfate, ammonium lauryl sulfate, triethanolamine lauryl sulfate, and sodium hexadecyl sulfate; alkyl ether sulfates such as ammonium lauryl ether sulfate; and alkylpolyether sulfates such as alkyl poly(ethylene oxide) sulfates. Alkyl sulfates, alkyl ether sulfates, alkylarylether sulfates are preferred as they provide a maximum void volume per microsphere for a minimum amount of suffactant.

Alkyl acrylate or methacrylate monomers useful in preparing the hollow microspheres of this invention are those monofunctional unsaturated acrylate or methacrylate esters of non-tertiary alkyl alcohols, the alkyl groups of which preferably have from about 4 to about 14 carbon atoms. Such acrylates are typically oleophilic, water emulsifiable, have restricted water solubility, and as homopolymers, generally have glass transition temperatures below about −20° C. Included within this class of monomers are, for example, isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and the like, singly or in mixtures.

Preferred acrylates include isooctyl acrylate, isononyl acrylate, isoamyl acrylate, isodecyl acrylate, 2-ethylhexyl acrylate, n-butyl acrylate, sec-butyl acrylate, and mixtures thereof. Acrylate or methacrylate or other vinyl monomers which, as homopolymers, have glass transition temperatures higher than about −20° C., e.g., tert-butyl acrylate, isobornyl acrylate, butyl methacrylate, vinyl acetate, and the like, may be utilized in conjunction with one or more of the acrylate or methacrylate monomers provided that the glass transition temperature of the resultant polymer is below about −20° C.

The acrylate is typically provided in an amount sufficient to provide a monomer to water weight ratio of about 1:9 to 1.5:1.0, more preferably 1.0:3.0 to 1.0:1.0.

The emulsion may also contain a multifunctional crosslinking agent. The term "multifunctional" as used herein refers to crosslinking agents which possess two or more free radically polymerizable ethylenically unsaturated groups. Useful multifunctional crosslinking agents include acrylic or methacrylic esters of diols (such as butanediol), triols (such as glycerol), and tetraols (such as pentaerythritol). Other crosslinking agents include polyvinylic crosslinking agents (such as substituted and unsubstituted divinylbenzene); and difunctional urethane acrylates.

A multifunctional crosslinking agent is typically required to prepare tack-free microspheres. When tack-free microspheres are desired, a multifunctional crosslinking agent is preferably present in an amount sufficient to provide about 0.3 to 10 equivalent weight percent of crosslinking agent. When tacky microspheres are desired, the use of a multifunctional crosslinking agent is optional. When used, however, the crosslinking agent is preferably present in an amount that provides less than 0.3 equivalent weight percent of crosslinking agent.

The properties of the hollow microspheres may be altered by addition of tackifying resin and/or plasticizer to the emulsion. Preferred tackifiers include hydrogenated rosin esters commercially available from companies such as Hercules Inc., under such trade names as Foral™, and Pentalyn™. Individual tackifiers include Foral™ 65, Foral™ 85, and Foral™ 105. Other useful tackifiers include those based on t-butyl styrene. Useful plasticizers include dioctyl phthalate, 2-ethyl hexyl phosphate, tricresyl phosphate, and the like.

Following polymerization, an aqueous suspension of the hollow microspheres is obtained which is stable to agglomeration or coagulation under room temperature conditions. The hollow microspheres of the invention are typically elastomeric. The term "elastomeric" has been described, for example, as ". . . applying to amorphous or non-crystalline materials that can be stretched to at least twice their original length and which will retract rapidly and forcibly to substantially their original dimensions upon release of the force." [S. L. Rosen, *Fundamental Principles of Polymeric Materials*, Wiley (New York, 1982) page 314]. The hollow microspheres of the invention are also typically solvent swellable, that is, they swell in a solvent causing the dimensions of the microspheres to increase. The hollow microspheres are also typically solvent-dispersible, that is, capable of forming a dispersion consisting substantially of individual particles in solvent. The microspheres are small, typically having diameters of at least 1 micrometer, preferably in the range of about 1 to about 250 micrometers. The voids typically range in size up to about 100 micrometers or larger. The majority of the hollow microspheres prepared by the methods of this invention contain at least one void with a void diameter which is at least about 3% of the diameter of the microsphere, preferably at least about 20%, more preferably, at least about 30%. The microsphere suspension may have non-volatile solids contents of from about 10 to about 50 percent by weight. Upon prolonged standing, the suspension separates into two phases, one phase being aqueous and substantially free of polymer, the other phase being an aqueous suspension of microspheres having at least one cavity, which, upon drying, becomes a void. Both phases may contain a minor portion of small latex particles. Decantation of the microsphere-rich phase provides a concentrated aqueous suspension which, if shaken with water, will readily redisperse. If desired, the aqueous suspension of hollow microspheres may be utilized immediately following polymerization. The suspension may also be coated on suitable flexible or inflexible backing materials by conventional coating techniques such as knife coating or Meyer bar coating or use of an extrusion die.

Alternatively, the aqueous suspension may be coagulated with polar organic solvents such as methanol, with ionic emulsifiers having a charge opposite to that of the emulsifier used in the polymerization process, or with saturated salt solutions, or the like, followed by washing and drying. The dried hollow microspheres, with sufficient agitation, will readily disperse in common organic liquids such as ethyl acetate, tetrahydrofuran, heptane, 2-butanone, benzene, cyclohexane, and esters. Solvent dispersions of the hollow microspheres may also be coated on suitable backing materials by conventional coating techniques, as described above for aqueous suspensions.

Suitable backing materials for the aqueous or solvent based coatings include paper, plastic films, cellulose acetate, ethyl cellulose, woven or nonwoven fabric formed of synthetic or natural materials, metal, metallized polymeric film, ceramic sheet material, and the like. Primers or binders may be used, but they are not required.

Suspensions or dispersions of the hollow microspheres in a liquid medium, e.g., water or an organic liquid as described above, may be sprayed by conventional techniques without cobwebbing or may be incorporated in aerosol containers with suitable propellants such as alkanes, alkenes, or chlorofluorocarbons, e.g., Freons™. Useful aerosol formulae typically have a solids content of from about 5% to about 20%, preferably from about 10% to about 16%.

Tacky hollow microspheres of the invention are especially useful for providing repositionable pressure-sensitive adhesives, i.e., pressure-sensitive adhesives having a degree of adhesion which permits separation, repositioning, and rebonding. Nontacky, hollow microspheres are especially useful as fillers for sealers, coatings, and adhesives. They can also be used as dry lubricants, vibration damping materials, and theology control agents.

These and other aspects of the invention are illustrated by the following examples which should not be viewed as limiting in scope.

EXAMPLES

Abbreviations and Tradenames

Standapol™ A ammonium lauryl sulfate available from Henkel, Ga.
Lucidol™ 70 benzoyl peroxide available from Atochem North America, Inc.
IOA isooctyl acrylate
HCI hydrochloric acid
Siponate™ DS-10 Sodium dodecyl benzene sulfonate commercially available from Rhone-Poulenc S.A.
Igepal™ CO-970 nonyl phenoxypoly(ethyleneoxy)ethanol commercially available from Rhone-Poulenc S.A.
Tween™ 80 Sorbitan Monooleate commercially available from Specialty Chemicals

Example 1

A one-liter resin reactor equipped with mechanical stirrer was charged with 450 grams of deionized water and 6 grams of Standapol™ A. The aqueous solution was stirred at 350 rpm and heated to 70° C. In a separate container, 141 grams of IOA, 9 grams of acetic acid and 0.71 grams of Lucidol™ 70 were mixed. The mixture was added to the hot aqueous surfactant solution while stirring at 350 rpm. The pH was determined to be 2.6. The temperature of the reactor was reduced to a polymerization temperature of 65° C., and the reactor was then degassed with nitrogen. After 10 hours at 65° C., the reactor was cooled to 25° C. The reactor content was emptied, and the suspension of microspheres filtered. The microspheres were viewed using an optical microscopy and found to be hollow microspheres. The diameter of the microspheres and the diameter of the cavity in them was measured with the optical microscope. The average ratio of the diameter of the cavities to the diameter of the microspheres (Dc/Dm) was determined to be 0.46. The microspheres were allowed to air dry at room temperature and were found to be tacky to the touch.

Examples 2 to 5

Microspheres were prepared according to the procedure described for Example 1, except that the aqueous solution of water and Standapol™ A was heated to 65° C.; a polymerization temperature of 60° C. was used; and the amount of acetic acid was varied to provide the pH shown in Table 1. The pH values were either measured with a pH probe or calculated based on the concentration of the acid employed. The microspheres were viewed using an optical microscopy and found to be hollow microspheres. The diameter of the microspheres and the diameter of the cavity in them was measured with the optical microscope. The average ratio of the diameter of the cavities to the diameter of the microspheres (Dc/Dm) was determined and can be found in Table 1. Upon drying as in Example 1, the microspheres were tacky to the touch.

TABLE 1

| Example | Acetic Acid grams | IOA grams | pH | Morphology | Dc/Dm |
|---|---|---|---|---|---|
| 1 | 9 | 141 | 2.6 | Hollow | 0.46 |
| 2 | 3.0 | 147 | 2.9 | Hollow | 0.51 |
| 3 | 0.1 | 150 | 3.6 | Hollow | 0.41 |
| 4 | 0.0365 | 150 | 4.0 | Hollow | 0,27 |
| 5 | 0.01 | 150 | 4.1 | Hollow | 0.03 |

Examples 6 to 10

Microspheres were prepared according to the procedure described for Example 1, except a polymerization temperature of 60° C. was used for Examples 8 and 9, and a variety of different acids were used in place of the acetic acid as shown in Table 2. The microspheres were viewed using an optical microscopy and found to be hollow microspheres. The diameter of the microspheres and the diameter of the cavity in them was measured with the optical microscope. The average ratio of the diameter of the cavities to the diameter of the microspheres (Dc/Dm) was determined and can be found in Table 2. Upon drying as in Example 1, the microspheres were tacky to the touch.

TABLE 2

| Example | Acid (grams) | IOA (grams) | pH | Morphology | Dc/Dm |
|---|---|---|---|---|---|
| 6 | HCl (0.43) | 150 | 0.43 | Hollow | 0.55 |
| 7 | Formic Acid | 150 | 3.0 | Hollow | 0.56 |
| 8 | Hexanoic Acid (9.0) | 141 | 3.2 | Hollow | 0.36 |
| 9 | Phenyl Undecanoic Acid (9.0) | 141 | 5.1 | Hollow | 0.05 |
| 10 | Stearic Acid (14.2) | 136 | 5.7 | Hollow | 0.05 |

These examples illustrate that a variety of acids that are not free radically polymerizable may be used in the emulsion process of the invention to provide hollow microspheres. These examples also illustrate that hollow microspheres are provided when the pH value of the emulsion is in the range of 0.43 to 5.7.

Examples 11–12 and Comparative Examples C-1 and C-2

Microspheres were prepared according to the procedure described for Example 1, except that a variety of different surfactants were used in place of the Standapol A as shown in Table 3. The hydrophilic-lipophilic balance (HLB) value for each surfactant is also shown in Table 3. The microspheres were viewed using an optical microscopy. The microspheres of Examples 11 and 12 were found to be hollow, while those of Comparative Examples C-1 and C-2 were found to be solid. The diameter of the hollow microspheres and the diameter of the cavity in them was measured with the optical microscope. The average ratio of the diameter of the cavities to the diameter of the microspheres (Dc/Dm) was determined and can be found in Table 3.

TABLE 3

| Example | Surfactant (grams) | HLB | Acetic Acid | IOA | Morphology | Dc/Dm |
|---|---|---|---|---|---|---|
| 2 | Standapol A | 32[2] | 3.0 | 147 | Hollow | 0.51 |
| 11 | Siponic Y-500-70 (2.14) | 16.1[1] | 3.0 | 147 | Hollow | 0.26 |
| 12 | Igepal CO-970 (1.5) | 18.2[1] | 3.0 | 147 | Hollow | 0.3 |
| C-1 | Siponate DS-10 (1.5) | 9.0[2] | 9.0 | 141 | Solid | 0.0 |
| C-2 | Tween 80 (1.5) | 15.0[2] | 3.0 | 147 | Solid | 0.0 |

[1]reported by vendor
[2]calculated. See the Encyclopedia of Emulsion Technolon, Vol. 3, Paul Becher, Marcel Dekker, Inc. (New York, 1988) pp 363–371 for HLB formulae.

These examples illustrate that preferred surfactants for preparing hollow microspheres comprising IOA, acetic acid, and Lucidol™ 70 include those that provide HLB values greater than 15. At HLB values less than or equal to 15, solid microspheres are obtained.

Example 13

Example 13 illustrates the use of an alternative alkyl acrylate ester (2ethylhexyl acrylate) and a copolymerizable acid (acrylic acid) in combination with a non-copolymerizable acid (acetic acid) in preparing tacky hollow microspheres.

These microspheres were prepared and analyzed according to the procedures described in Example 1 except that the aqueous solution of water and Standapol™ A was heated to 68° C. and mixed at 450 rpm; the monomer mixture contained 141 grams 2-ethylhexyl acrylate (2-EHA), 6 grams acetic acid and 3 grams acrylic acid; and the reaction was run for 22 hours while mixing at 450 rpm. The pH was determined to be 2.6. The resulting hollow microspheres had a Dc/Dm of 0.73 and, when dried, were tacky to the touch. (av. diameter =41 μm)

Example 14

Example 14 illustrates the preparation of tack-free hollow microspheres using the method of the present invention. Microspheres were prepared according to the following procedure: A one-liter resin reactor equipped with a magnetic stirrer was charged with 450 grams of deionized water and 6 grams Standapol™ A. The aqueous solution was stirred at 375 rpm and heated to 68° C. In a separate container, 144 grams 2-ethylhexyl acrylate (2-EHA), 6 grams acetic acid, 1.5 grams 1,4-butanediol diacrylate (BDDA), and 0.74 gram Lucidol™ 70 were mixed. The mixture was added to the hot aqueous surfactant solution while stirring at 350 rpm. The pH was determined to be 2.9. The reactor temperature was reduced to a polymerization temperature of 65° C., and the reactor was then degassed with nitrogen. After 22 hours at 65° C., the reactor was cooled to 25° C. The reactor content was emptied, and the suspension of microspheres filtered. The microspheres were viewed using an optical microscope and found to be hollow microspheres. The average of the diameter of the cavities to the diameter of the microspheres (Dc/Dm) was determined to be 0.66. Upon drying, the microspheres were found to be tack-free. (av. diameter=48 μm).

What is claimed is:

1. A process for preparing an aqueous suspension of hollow, acrylate polymer microspheres, said process comprising the steps of:
   (1) forming an emulsion of monomer droplets in an aqueous phase by blending a mixture comprising:
      (i) at least one monomer of an alkyl acrylate or methacrylate ester of a non-tertiary alcohol,
      (ii) at least one acid that is not free radically polymerizable,
      (iii) at least one emulsifier, and
      (iv) water, and
   (2) initiating polymerization of the monomer droplets.

2. A process according to claim 1 additionally comprising a drying step after said polymerization step to form microspheres having at least one void.

3. A process according to claim 1 wherein said step (2) comprises the application of heat.

4. A process according to claim 1 wherein said step (2) comprises the application of radiation.

5. A process according to claim 1 additionally comprising the step of coating said aqueous suspension on a backing.

6. A process according to claim 1 wherein said at least one acid is selected from the group consisting of acetic acid, hexanoic acid, phenyl undecanoic acid, stearic acid, and hydrochloric acid.

7. A process according to claim 1 wherein said emulsifier is used in concentrations greater than its critical micelle concentration.

8. A process according to claim 1 wherein said mixture additionally comprises at least one multifunctional crosslinking agent.

9. A process according to claim 8 wherein said multifunctional crosslinking agent is present in an amount sufficient to provide tacky microspheres upon drying.

10. A process according to claim 8 wherein said multifunctional crosslinking agent is provided in an amount sufficient to provide tack-free microspheres upon drying.

11. A process according to claim 1 wherein said mixture additionally comprises at least one initiator.

12. A process according to claim 1 wherein said at least one monomer is selected from the group consisting of alkyl acrylate or methacrylate esters of non-tertiary alcohols, the alkyl groups of which have from about 4 to about 14 carbon atoms.

13. A process according to claim 1 wherein the weight ratio of said at least one monomer to said water is in the range of from about 1.0:9.0 to about 1.5:1.0.

14. A process according to claim 1 wherein the weight ratio of said at least one monomer to said water is in the range of from about 1.0:3.0 to about 1.0:1.0.

15. A process according to claim 1 wherein said hollow, acrylate polymer microspheres have a diameter in the range of about 1 to about 250 micrometers.

16. A process according to claim 2 wherein said void has a diameter that is 3 percent of the diameter of the microsphere.

17. A process according to claim 1 additionally comprising the step of spraying said aqueous suspension onto a substrate.

* * * * *